F. BLACKBURN.
ELEVATING TRUCK.
APPLICATION FILED MAR. 19, 1918.
Reissued Dec. 24, 1918. 14,575.
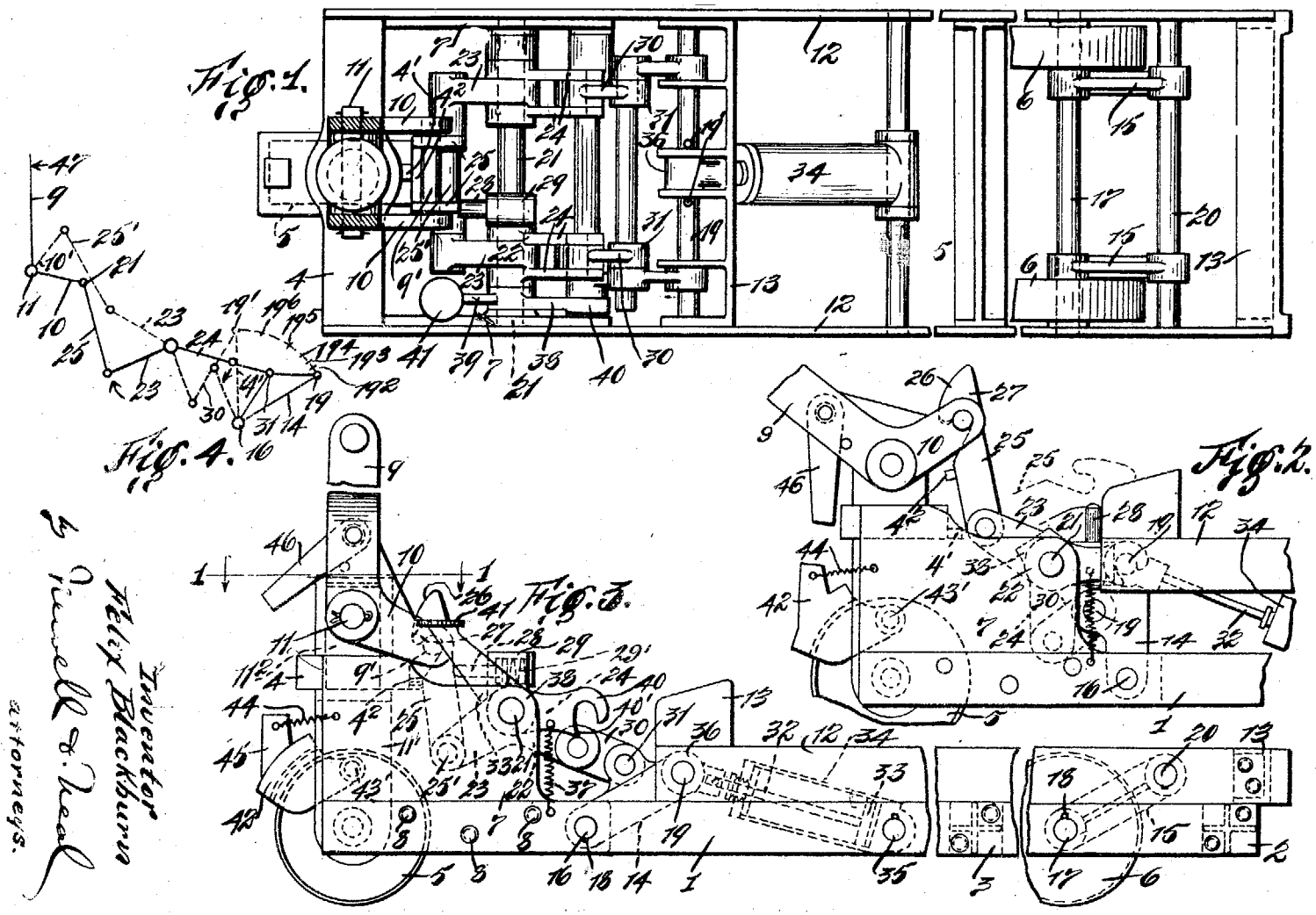
Inventor
Felix Blackburn
by Fiswell & Neal
attorneys.

UNITED STATES PATENT OFFICE.

FELIX BLACKBURN, OF FEEDING HILLS, MASSACHUSETTS, ASSIGNOR TO J. LEWIS WYCKOFF, EDWARD N. WHITE, AND GEORGE F. JENKS, TRUSTEES, DOING BUSINESS AS COWAN TRUCK COMPANY, OF HOLYOKE, MASSACHUSETTS.

ELEVATING-TRUCK.

14,575. Specification of Reissued Letters Patent. Reissued Dec. 24, 1918.

Original No. 1,243,035, dated October 16, 1917, Serial No. 107,234, filed July 3, 1916. Application for reissue filed March 19, 1918. Serial No. 223,460.

*To all whom it may concern:*

Be it known that I, FELIX BLACKBURN, a subject of the King of Great Britain, residing at Feeding Hills, Hampden county, Massachusetts, have invented certain new and useful Improvements in Elevating-Trucks, of which the following is a clear, full, and exact description.

This invention relates to elevating trucks and particularly to elevating trucks of the type in which the elevation of the load support or platform is effected through connections to a steering and draft handle. The invention is herein shown as embodied in a truck of the type intended to be used with portable platforms or "skids" upon which the material to be transported is supported at such a height that the elevating platform of the truck can be moved therebeneath, but it will be understood that the invention is not restricted to the embodiment or uses herein illustrated and described, and that many features of the invention are of general applicability in the art to which it relates.

A general object of the invention is to increase the facility with which a truck of the handle elevating type may be manipulated to elevate, transport and deposit loads under the usual conditions which such trucks are called upon to meet.

More particularly the invention aims to facilitate the connection of the steering and draft handle to, and its disconnection from, the elevating mechanism in a truck of the handle elevating type, and, to this end, to provide means whereby, by simple manipulation of the truck handle, the required connection and disconnection may be effected.

Important features of the invention are the novel means for securing the elevating support or platform in its elevated position, the novel means for releasing the elevating platform and impelling it toward its lowered position, the means controlled from the steering handle for braking the movement of the truck, and the novel lever arrangement between the handle and the elevating support, whereby an even steady movement of the parts is obtained during the load elevation, with the greatest leverage or lifting effect exerted upon the elevating support when the load is first started from a state of rest.

Other objects and important features of the invention will appear from the following description and claims when considered in connection with the accompanying drawings in which—

Figure 1 is plan view of the truck showing the operating mechanism, portions of the upper and lower frames being broken away; this view also shows a section on the line 1—1 Fig. 3;

Fig. 2 is a detail side elevation of a portion of the truck illustrating the operating or lifting mechanism, the elevating frame of the truck being shown in its raised position;

Fig. 3 is a side elevation of the truck with the elevating frame in its lowered position, the operating handle being in position for starting the elevating movement of the elevating frame, this view also showing portions of the frame broken away; and Fig. 4 is a diagrammatic view showing in full and dotted lines the positions of the elevating mechanism before and after the load is lifted.

Referring to the drawings in detail, the main or lower frame of the truck comprises the side bars 1, end bar 2 and the frame head 4. The frame head 4 comprises depending side plates 7, preferably integral therewith, which are secured to the side bars 1 by the rivets 8 or other suitable means.

The lower frame is supported on wheels 5 and 6, the front wheel 5 constituting also a steering wheel adapted to be controlled by the operating handle 9 which is preferably formed with two L-shaped fork members having the short arms 10 of the L-shaped parts extending rearwardly from the pivot 11, upon which the handle 9 is fulcrumed for vertical swinging movement.

The handle pivot or fulcrum 11 is carried by the cylindrical swivel part $11^2$ of the steering head 11′, which carries the steering wheel 5, the part $11^2$ being swiveled in the frame head 4, as shown in Fig. 3 of the drawings, and the pivot 11 being carried by that part of the swivel $11^2$ which projects above the frame head 4.

The elevating frame or support comprises a pair of longitudinal bars 12 and transverse end bars 13. This frame has a parallel link connection to the main frame, comprising the elevating links 14 and 15, the lower ends of these links being pivotally mounted on the rods or shafts 16 and 17 rigidly secured in the side bars 1 of the main frame by means of the keys 18. The upper ends of the elevating links 14 and 15 are pivotally mounted upon the transverse shafts 19 and 20, respectively, rigidly secured at their ends in the elevating frame. From the arrangement of the parts it will be seen that movement of the elevating frame forward upon the lower or base frame of the truck will effect an elevation of this frame through the action of the parallel links 14 and 15, this elevation taking place with the frames in substantial parallelism throughout the elevating movement.

Mechanism is provided whereby a connection may be effected between the operating handle 9 and the elevating frame or the means through which said frame is elevated, so that the elevation of the frame may be effected through the vertical swinging movement of said handle. The illustrated mechanism comprises a shaft 21 extending between and secured in the side plates 7 of the head 4, upon which shaft are pivotally mounted two bell crank levers 22 having the arms 23 and 24 arranged at a suitable angle to each other. Pivotally mounted between the arms 23 of the bell crank levers, upon a rod 25′ carried by said arms, is a link 25 having hooks 27 formed at its upper end, constituting a latch member. The forward upper ends or edges of this link are curved to form cams 26 for a purpose hereinafter to be set forth. The hook portions 27 of the link 25 are adapted to coöperate with a catch member in the form of a pin or rod 9′ extending between the arms 10 of the operating handle 9, and the link 25 is normally forced forward into the path of movement of the pin or rod 9, when the elevating frame is in its lowered position, by means of the spring-actuated plunger 28 mounted in the casing 29 and acted upon by the spring 29′.

In order that the link 25 may be free to be disconnected from the operating handle 9 when the elevating frame has been moved into its elevated position, the casing 29 is preferably so mounted that the plunger 28 will cease to act upon the link 25 after the elevating frame has been elevated. In the illustrated construction, the casing 29 is secured in any suitable manner to the upper side of one of the bell crank levers 22, preferably being cast solid therewith, and therefore moves with this lever, when said lever is rocked, into the position shown in Fig. 2, during the elevation of the elevating support or frame. The other arms 24 of the bell crank levers 22 are connected by means of short links 30 to a shaft carried by bosses 31, upon the elevating links 14.

The downward movement of the elevating support or platform may be checked by a suitable dash-pot, the illustrated check comprising a piston rod 32 pivotally mounted upon the shaft 19 and carrying a piston 33 working in a cylinder 34, pivotally mounted upon the shaft 35 carried by the main or base frame. The pivotal connection of the piston rod 32 with the shaft 19 comprises a head 36 which is maintained in its central position upon the shaft 19 by means of pins 19′.

From an inspection of Fig. 2 of the drawings, it will be noted that the elevating links 14 are substantially in vertical position, that is, with their upper and lower pivots 16 and 19 in substantially vertical alinement, when the elevating frame or support is in its elevated position and that the frame or support will thus tend to remain in elevated position if not disturbed by the movement of the truck. In order to lock the frame in its elevated position, a locking lever 38 is fulcrumed upon the shaft 31 in such position that its hook-shaped end 40 will latch over the shaft 19 which acts as a catch when the elevating support is in its elevated position, this end of the lever being normally drawn down into position to be engaged by the shaft 19 by means of the coiled spring 37, the rearward face of the hook 40 being so shaped that the shaft 19 will snap into the hook 40 when the elevating frame is raised, as shown in Fig. 2. The forwardly extending arm 39 of the lever 38 is provided with a pedal 41.

When the parts are in the position shown in Fig. 2, the elevating frame is locked by the hook portion 40 of the lever 38 against movement out of its elevated position. When it is desired to release the elevating frame, the operator simply depresses the pedal 41, thereby raising the hook 40 against the tension of the spring 37, thus freeing the shaft 19. The underside of the hook 40 has a projection 40′ which pushes the shaft 19 over the center, that is, rearwardly beyond the vertical line through the axes of the shafts 16 and 19 and thus allows the load to fall by gravity.

The forward wheel 5 of the truck is provided with a brake block or shoe 42, which is pivotally connected to the sides of the steering head wheel fork 11′ at the points 43′. This shoe is normally held out of contact with the periphery of the wheel by means of the spring 44 attached to an upwardly extending projection 45 on the shoe. When it is desired to use the brake, the pendant bar 46 can be unlatched from the handle 9 and allowed to hang in a vertical position so that as the handle 19 is lowered, the pendant bar 46 will engage the projection 45 and force the brake shoe downward against the wheel 5 for the purpose of braking the truck should the floor be inclined. When not in use, the pendant bar 46 lies flat or is secured to the inside of the handle fork.

The operation of the truck may be briefly described as follows: When the parts, with the exception of the handle 9, are in the position shown in Fig. 3, the handle being disconnected from the elevating mechanism, if the operator moves the handle rearwardly, the latch bolt or pin 9 will engage the inclined surface 26 of the hook 25, thus forcing this hook rearwardly against the action of the spring of the plunger 28 until the latch bar 9′ snaps into the hook 25, as shown in Fig. 3. The operator next moves the handle 9 forward in the direction of the arrow 47 (see Fig. 4). This causes the operating links to assume the positions shown in Fig. 2 and in dotted lines in Fig. 4, and the elevating links 14 and 15 are brought into the vertical position shown in Fig. 2. The transverse shaft 19 is engaged by the locking hook 40, as shown in Fig. 2, which locks the elevating frame in its raised position shown in this figure.

During the travel of the links 14 from their full line position to the dotted line position shown in Fig. 4, it will be observed that they are moved into a vertical position at the end of their swinging movement. The greatest leverage of the system is used to start the load. At starting, the load on the platform or "skids" is lifted nearly in a vertical direction, as indicated in Fig. 4 at $19^2$, its first position. As the handle 9 is moved downward through equal arcs or divisions, it will be found that the leverage required to lift the load gradually decreases from start to finish, as shown by the spaces indicated at $19^2$, $19^3$, etc., that is to say, with the movement of the handle 9 through equal arcs or steps, the upper ends of the links 14 and 15 will, as they rise, pass through arcs that are longer and longer, as indicated in Fig. 4 at $19^4$, $19^5$, $19^6$, etc., thus decreasing the leverage, but by reason of the gradual approach of the links toward a horizontal movement, the force required to be exerted upon the handle for each of the equal arcs or steps of its movement will be substantially the same. At the beginning, however, as stated, the leverage is the greatest when the greatest leverage is required. The load is then being lifted in almost a vertical direction, but as the links rise, their upper ends will travel in a path that is more nearly horizontal. Less leverage is of course needed after starting than at the time of starting from a state of rest.

After the load is elevated and held in its locked position by the hook 40, the operating handle 9 stands in its lowest position. In order to unlock the operating handle 9 from the link 25 and leave it free for use in drawing and steering the load, the operator moves the same rearwardly a sufficient distance to cause the link 25 to fall by gravity and assume the dotted line position shown in Fig. 2, the backward swing of the link 25 being effected by the travel of the pin 9 over the inclined lower side of the hook opening in the link.

It will be seen that the link 25 will resume a position to permit the reëngagement of the pin 9′ therewith by the backward swing of the handle when the elevating frame or support is moved to its lowered position, as shown in Fig. 3. A projection 4′ on the frame prevents the link from falling too far forward and the spring plunger 28, while maintaining the link in the path of movement of the pin 9′, permits a backward swing of the link sufficient to enable the pin to snap into the hook 27 of the link. The projection $4^2$ may also be provided on the link to move over the top of the projection 4′ to hold the link in proper position.

In order to release the load, the operator places his foot on the plate or pedal 41, which causes the hook arm 40 of the lever 38 to be elevated, thus releasing the shaft 19 and allowing the load to be pushed or started back by the projection 40′ upon the continued downward movement of the treadle 41. The regulating mechanism of the cylinder 34, which is preferably filled with oil or some other heavy liquid, serves to allow the load to descend slowly by gravity.

What I claim is:

1. An elevating truck comprising the combination with a main wheeled supporting frame, of a frame pivotally connected thereto and adapted to be elevated with relation to the main frame, an operating handle, bell-crank levers, detachable connecting means between the forward arms of said levers and the handle, connecting means between the other arms of the bell-crank levers and the pivotally connected frame, and means including a bell-crank mounted on the same support as said bell crank levers and having a hook on one arm thereof for retaining the latter frame in an elevated position and for permitting its release when the other arm of the retaining means is operated.

2. An elevating truck comprising in combination, a main frame, an elevating frame pivotally connected to said frame, an operating handle, link devices between the operating handle and the elevating frame, a shaft for supporting one of the links of said devices, devices for connecting said handle to one of the links as the handle is moved rearwardly, means for locking the elevating frame in its raised position, said locking means being pivotally mounted on the said shaft and means for unlocking said handle after the elevating frame is locked when said handle is moved rearwardly again.

3. In an elevating truck the combination with a main frame mounted on wheels, of a second frame pivotally connected to the main frame by rigid one piece links located at the front and rear ends of said frames, links connected to the front links, a pair of bell crank levers pivotally connected to the main frame and having one pair of their arms connected to said forward links by means of the links that are attached to the said last named links, an operating handle with two arms, a bolt connecting said arms and means for detachably connecting the other pair of arms of said bell crank levers to the bolt of said handle.

4. In an elevating truck the combination with a main frame mounted on wheels, of a second frame pivotally connected to the main frame by links located at the front and rear ends of said frames, bell crank levers pivotally connected to the main frame, intermediate links connected to a pair of arms of said levers and to said front links, an operating handle, means for detachably connecting the other arms of said levers to said handle, and means for retaining the last named means in position to engage and lock the handle to said means when said handle is moved rearwardly.

5. An elevating truck comprising in combination with a main frame, of an elevating frame pivotally connected thereto, an operating handle, a pair of bell crank levers, a shaft upon which said levers are loosely mounted, links connecting the arms of said levers to the connection between the elevating frame and the main frame, links connected to the other arms of the bell crank levers, said last named links being formed with hook shaped ends for automatic engagement with the operating handle when the elevating frame is to be raised.

6. In an elevating truck, the combination of a main frame, an elevating frame, an L-shaped operating handle, a fixed shaft, bell crank levers mounted thereon, a hook shaped link connected to one of the arms of each of said levers and normally maintained in position for engagement by the operating handle, links for connecting the other arms of the bell crank levers to the elevating frame, and means for maintaining the latter frame in a raised position.

7. An elevating truck, comprising in combination with a main frame, an elevating frame pivotally connected thereto, operating mechanism for elevating the elevating frame and including link connections between the main and elevating frames, three bell crank levers pivotally mounted in the main frame and a common shaft on which said levers are loosely mounted, two of said levers being connected directly to said links and included in the operating mechanism for raising the elevating frame, the other one of said levers being designed for locking the latter frame in a raised position, and means comprising a handle for operating the elevating mechanism, all constructed and arranged to exert the greatest leverage when the load is first started.

8. An elevating truck comprising in combination with a main frame, an elevating frame pivotally connected thereto, a shaft, a lever mounted thereon, a connecting link between the lever and the said connection between the elevating frame and the main frame, an operating handle, a second link having a hook formed at one end for detachably engaging said handle during the elevating operation and releasable therefrom, said second link being permanently connected to said lever, a device for normally holding the second link in position for engagement by said handle, said device being located on and movable with said lever.

9. The combination in an elevating truck, of a main frame, an elevating frame, links for connecting the frames together, an operating handle having rearwardly extending arms, a bolt connecting the arms, a pair of bell crank levers disposed at the rear of said arms, links each connected at one end to one of the levers and its other end being formed with a hook for engaging said bolt, other links interposed between and connected to said levers and the connecting links between the frames, the pivotal points of connection between the handle and the connecting links between the frames being such that the greatest lifting effect is produced as the operating handle is started from its position of rest.

10. The combination, in an elevating truck, of a main wheel-supporting frame, an elevating frame superimposed thereon, links connecting said frames, an operating handle having rearwardly extending spaced portions, a bolt connecting the portions, a shaft extending across the main frame and in the rear of said handle, operating connections between the bolt and the elevating frame and comprising bell crank levers with depending forwardly and rearwardly extending arms mounted loosely on the shaft, the forwardly extending arms having a detachable connection with the bolt and the rearwardly extending arms having a permanent connection with said links connected to the elevating frame, and means comprising a rearwardly extending hook also mounted on the shaft for retaining the elevating frame in a raised position and a forwardly extending arm connected to the hook and designed to be engaged by the operator for unlocking the elevating frame when this frame is to assume its lowered position.

11. In an elevating truck the combination with a wheel supported main frame, of an elevating frame pivotally connected thereto, a fixed shaft forward of the elevating frame, a pair of bell crank levers loosely mounted on said shaft, an operating handle having rearwardly extending arms, operative connecting means between the handle and the bell crank levers and including hook-shaped links designed for automatic attachment to the handle as the handle is moved rearwardly and for automatic detachment when the load has been elevated by a rearward movement of the handle, operating connecting means between the bell crank levers and the connecting means between the elevating frame and the main frame, and locking means also loosely mounted on the fixed shaft and comprising a bell crank lever, one arm having a hook to engage the elevating frame and the other arm extending forward and upward within easy reach of the operator for manually releasing the elevating frame as desired.

12. An elevating truck comprising a wheel supported base member, a frame pivotally connected to said member, an operating handle connected to said member, lever connecting means between the handle and the pivotally connected frame for elevating the frame, a bell crank lever for locking the frame in its elevated position, one arm of which is formed with a notch to engage a part of the frame, said notch having a forwardly projecting shoulder to act as a pushing device against said part to move the elevating frame past its raised center position for allowing the load to fall by gravity, the other arm of the bell crank lever designed to be depressed by the foot of the operator for the purpose described.

13. In an elevating truck, the combination with a truck base having supporting and steering wheels, and a steering handle arranged to swing vertically as well as laterally, of an elevating support, means to connect said support and handle to effect elevation of said support by vertical movement of said handle, said connecting means comprising interengaging members one of which is carried by the handle and the other of which is movable into and out of the path of movement of the handle carried member, and means acting concomitantly with the movement of said support to lowered position to position the second mentioned member for automatic connection with said handle carried member on the backward movement of said handle.

14. In an elevating truck, the combination with a wheeled base, of an elevating support and a steering and draft handle, means for elevating said support upon said base including a member adapted to be disengaged from said handle, said member movable into and out of connecting relation thereto, and means whereby the lowering of the elevating support positions said member in the path of movement of said handle for automatic connection thereto.

15. In an elevating truck, the combination with a truck base having supporting and steering wheels, a steering handle arranged to swing vertically as well as laterally, an elevating support, means for elevating said support upon said base by the vertical swinging movement of said handle, said means comprising interengaging members one of which is carried by the handle, said members being normally out of the paths of movement of each other when said support is in raised position, and means acting concomitantly with the movement of the elevating support into its lowered position for so positioning said members that they become automatically engaged upon the backward movement of said handle.

16. In an elevating truck, the combination with a wheeled base, an elevating support and a steering and draft handle, of means to connect said support and said handle to effect elevation of said support by vertical movement of said handle, said connecting means comprising interengaging members one of which is carried by the handle, means acting concomitantly with the movement of said support to lowered position to position the other of said members for automatic engagement with the handle carried member upon backward movement of said handle, and means carried by one of said members and coöperating with the other upon the backward movement of said handle, when said support is in elevated position, for effecting the disengagement of said members.

17. In an elevating truck, the combination with the truck base having supporting and steering wheels, an elevating support and a steering and draft handle arranged to swing also in a vertical plane, of means for elevating said support comprising a connection to said handle, means whereby said connection is automatically effected by the backward movement of said handle when the support is in its lowered position, and means whereby said connection is automatically broken by the backward movement of said handle when said support is in its elevated position.

18. In an elevating truck, the combination with a wheeled base and a pivotally mounted draft handle, of an elevating support, means to connect said support and said handle to effect elevation of said support by movement of said handle, said connecting means comprising a latch and catch said latch and catch being so constructed and arranged that connection between the handle and support is automatically effected upon the backward movement of said handle, and means operable when said support is in elevated position whereby the backward movement of said handle effects a relative movement of said latch and catch into disengagement.

19. In an elevating truck, the combination with a truck base having supporting and steering wheels, a steering handle adapted to swing also in a vertical plane, and an elevating support, of means for elevating said support comprising a member adapted to be connected to said handle to partake of the vertical swinging movement thereof, means maintaining said member in position for automatic connection to said handle upon the backward movement of said handle when the elevating support is in lowered position, and means for causing said backward movement of said handle to break said connection when said support is in elevated position.

20. In an elevating truck, the combination with a wheeled base, an elevating support carried by said base, and a steering and draft handle arranged to swing both vertically and laterally, of elevating mechanism adapted to be operated by the vertical swinging movement of said handle, said mechanism comprising a connecting member and means whereby said member is pressed yieldingly into the path of movement of said handle for automatic connection thereto when said elevating support is in its lowered position, and means for rendering said pressing means inoperative when said elevating support moves to its elevated position.

21. In an elevating truck, the combination with a truck base having steering and supporting wheels, an elevating load support and a steering and draft handle, of means for elevating said support comprising a member adapted to be connected to and disconnected from said handle, means operating to maintain said member yieldingly in the path of movement of said handle for automatic connection thereto, and connections between said means and said elevating support whereby said means is maintained in operative position when said support is in lowered position and is rendered inoperative when said support moves to its elevated position.

22. In an elevating truck, the combination with the truck base and an elevating support, of means whereby the movement of said support lengthwise of said base effects the elevation thereof, said means being movable into a relation tending to maintain said support in elevated position, means for locking said support in elevated position comprising a latch and a catch, manually operated means for releasing said locking means, and means carried by said latch and cooperating with said catch to move said support toward its lowered position upon the release of said locking means.

23. In an elevating truck, the combination with the wheeled base, the elevating support and a steering and draft handle arranged to swing vertically as well as laterally, of means for elevating said support upon said base comprising a hook-like member pivoted upon said support and a member upon said handle over which said first-mentioned member hooks, one of said members having a cam face with which the other coöperates upon the backward movement of said handle to swing said hook member back upon said support.

24. In an elevating truck, the combination with the wheeled base, the elevating support and a steering and draft handle arranged to swing vertically as well as laterally, of means for elevating said support upon said base comprising a hook-like member pivoted upon said support and a member upon said handle over which said first-mentioned member is adapted to hook, said hook-like member being adapted to swing upward and backward out of engagement with said handle member, and one of said members being provided with a cam face to effect such swinging movement upon the backward movement of said handle.

25. In an elevating truck, the combination with the wheeled base, the elevating support and a steering and draft handle arranged to swing vertically as well as laterally, of means for elevating said support upon said base comprising a hook-like member pivoted upon said support and a member upon said handle over which said first-mentioned member hooks, said hook-like member being movable upward about its pivot from a position in which it remains in hooked engagement with said handle member into a position in which it remains disengaged from said handle member, and coöperating surfaces upon said two members shaped to effect such movement of the hook-like member when said handle is moved backward.

26. In an elevating truck, the combination with the wheeled base, the elevating support and a steering and draft handle arranged to swing vertically as well as laterally, of means for elevating said support upon said base comprising a hook-like member pivoted upon said support and a member upon said handle over which said first-mentioned member hooks, said hook-like member being provided below its hook portion with a cam face shaped to effect backward movement of said hook into inoperative position as said handle-carried member rides over said cam face upon the backward swinging movement of said handle.

27. In an elevating support, the combination with the wheeled base and the elevating support, of means for locking said support in elevated position comprising locking members, one of which is carried by the base and the other by the support, and manually controlled means for effecting the disengagement of said locking members, said members having coöperating faces so shaped that said disengaging movement effects a movement of said support toward lowered 28. In an elevating truck, the combination with the wheeled base and an elevating support, of means for locking said support in elevated position comprising a locking member fulcrumed upon said base, and a second locking member carried by said support, said first-mentioned locking member having a cam face arranged to act upon the other locking member during the disengaging movement of said members in a manner to effect the movement of said support toward lowered position.

FELIX BLACKBURN.